(12) United States Patent
Oku

(10) Patent No.: US 9,936,083 B2
(45) Date of Patent: Apr. 3, 2018

(54) IMAGE OUTPUT SYSTEM

(71) Applicant: KYOCERA Document Solutions Inc., Osaka-shi, Osaka (JP)

(72) Inventor: Toyoaki Oku, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/360,356

(22) Filed: Nov. 23, 2016

(65) Prior Publication Data

US 2017/0155776 A1 Jun. 1, 2017

(30) Foreign Application Priority Data

Nov. 27, 2015 (JP) ................................. 2015-231771

(51) Int. Cl.
*H04N 1/00* (2006.01)
*G06K 15/02* (2006.01)

(52) U.S. Cl.
CPC ..... *H04N 1/00095* (2013.01); *G06K 15/1836* (2013.01); *H04N 1/00124* (2013.01); *H04N 1/00204* (2013.01); *H04N 1/00344* (2013.01); *H04N 1/00442* (2013.01); *H04N 2201/0039* (2013.01); *H04N 2201/0094* (2013.01)

(58) Field of Classification Search
CPC .................................................. H04N 1/00095
USPC .......................................................... 358/1.15
See application file for complete search history.

(56) References Cited

U.S. PATENT DOCUMENTS

| 2009/0059275 | A1* | 3/2009 | Tomita | G06F 3/1214 358/1.15 |
| 2013/0321844 | A1* | 12/2013 | Ohara | G06F 3/1205 358/1.13 |

FOREIGN PATENT DOCUMENTS

JP 2001282470 A 10/2001

* cited by examiner

*Primary Examiner* — Jacky X Zheng
(74) *Attorney, Agent, or Firm* — Alleman Hall Creasman & Tuttle LLP

(57) ABSTRACT

An image output system includes a terminal, a server, and a printing device that are communicable with each other via a network. The server includes: a storage device; and a CPU that executes a program for the server to function as a data generating portion configured to generate raster image data by executing a RIP process on the basis of print data received from the terminal and as a data transmitting portion configured to transmit data for outputting an image, to a destination that outputs the image. The data transmitting portion transmits, to the destination, the print data received from the terminal or the raster image data generated by the data generating portion, according to a kind of the destination.

4 Claims, 12 Drawing Sheets is based upon and claims the benefit of priority from the corresponding Japanese Patent Application No. 2015-231771 filed on Nov. 27, 2015, the entire contents of which are incorporated herein by reference.

BACKGROUND

The present disclosure relates to an image output system including a server capable of generating raster image data on the basis of print data.

Conventionally known is an image forming apparatus that determines whether or not a data file is one that can be processed in the image forming apparatus and then generates therein raster image data for execution of printing on the basis of the data file in a case where the data file is one that can be processed therein and causes a server to generate raster image data for execution of printing on the basis of the data file in a case where the data file is one that cannot be processed therein.

SUMMARY

An image output system according to one aspect of the present disclosure includes a terminal, a server, and a printing device that are communicable with each other via a network. The server includes: a storage device; and a CPU that executes a program for the server to function as a data generating portion configured to generate raster image data by executing a RIP process on the basis of print data received from the terminal and as a data transmitting portion configured to transmit data for outputting an image, to a destination that outputs the image. The data transmitting portion transmits, to the destination, the print data received from the terminal or the raster image data generated by the data generating portion, according to a kind of the destination.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings.

Firstly, a configuration of an image output system according to the present embodiment will be described.

Figure 1:
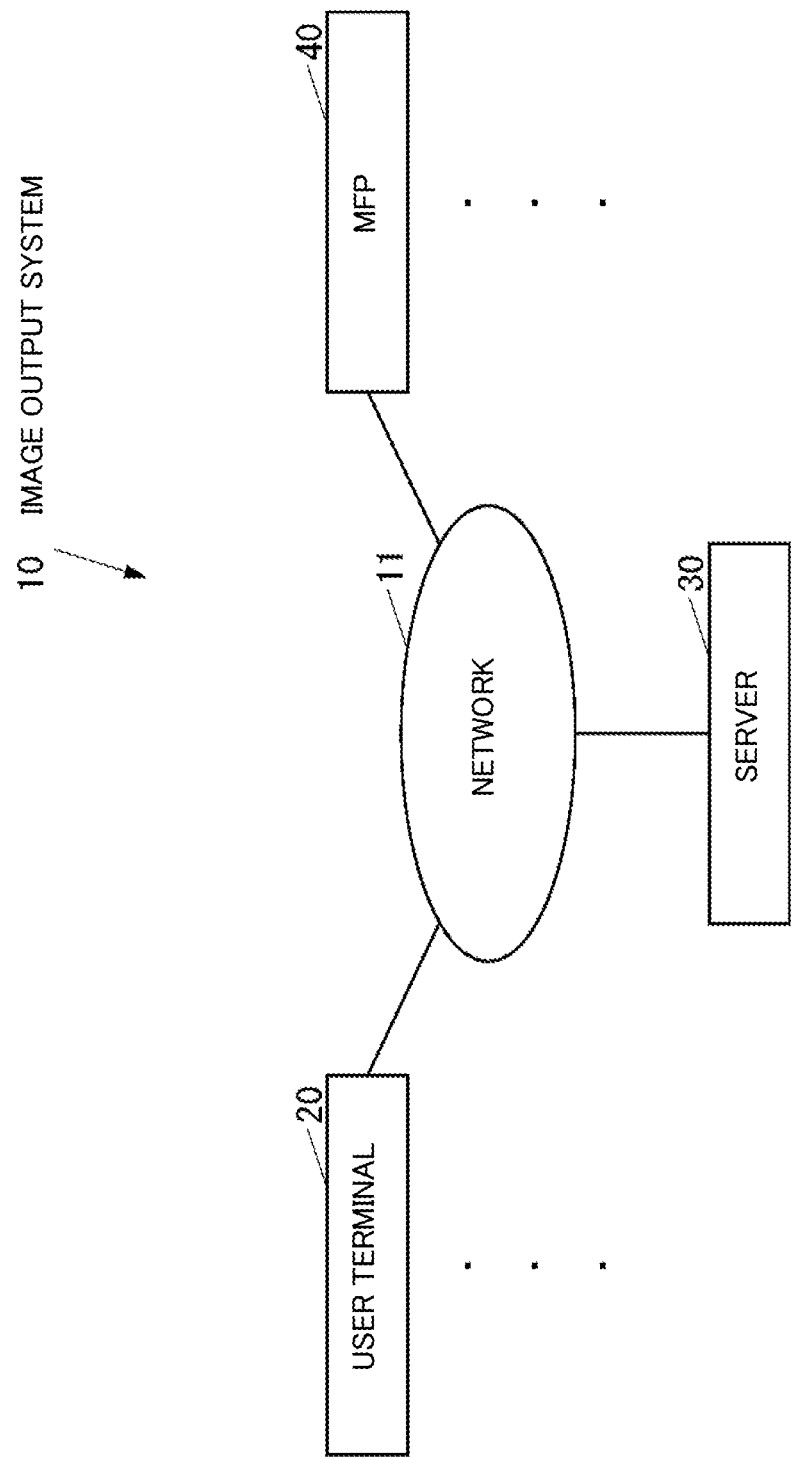
FIG. 1 is a block diagram illustrating an image output system according to an embodiment of the present disclosure.

FIG. 1 is a block diagram illustrating an image output system 10 according to the present embodiment.

As illustrated in FIG. 1, the image output system 10 includes: a user terminal 20 which is an electronic device that generates print data; a server 30; and a multifunction peripheral (MFP) 40 which is a printing device that executes printing on the basis of job data that is data for a print job. The user terminal 20, the server 30, and the MFP 40 are communicable with one another over a network 11 such as a local area network (LAN) and the Internet.

The print data generated by the user terminal 20 is data described in a page description language (PDL) such as a printer command language (PCL) or a Kyocera page description language (KPDL).

The server 30 has, as specifications of a machine, higher performance and higher data processing capability than the MFP 40.

Note that the image output system 10 may include a plurality of user terminals that are similar to the user terminal 20. The user terminal 20 will be described below as a representative of the user terminals included in the image output system 10.

Similarly, the image output system 10 may include a plurality of MFPs that are similar to the MFP 40. The MFP 40 will be described below as a representative of the MFPs included in the image output system 10.

The user terminals and the MFPs that are included in the image output system 10 are each an electronic device of the present disclosure.

Figure 2:
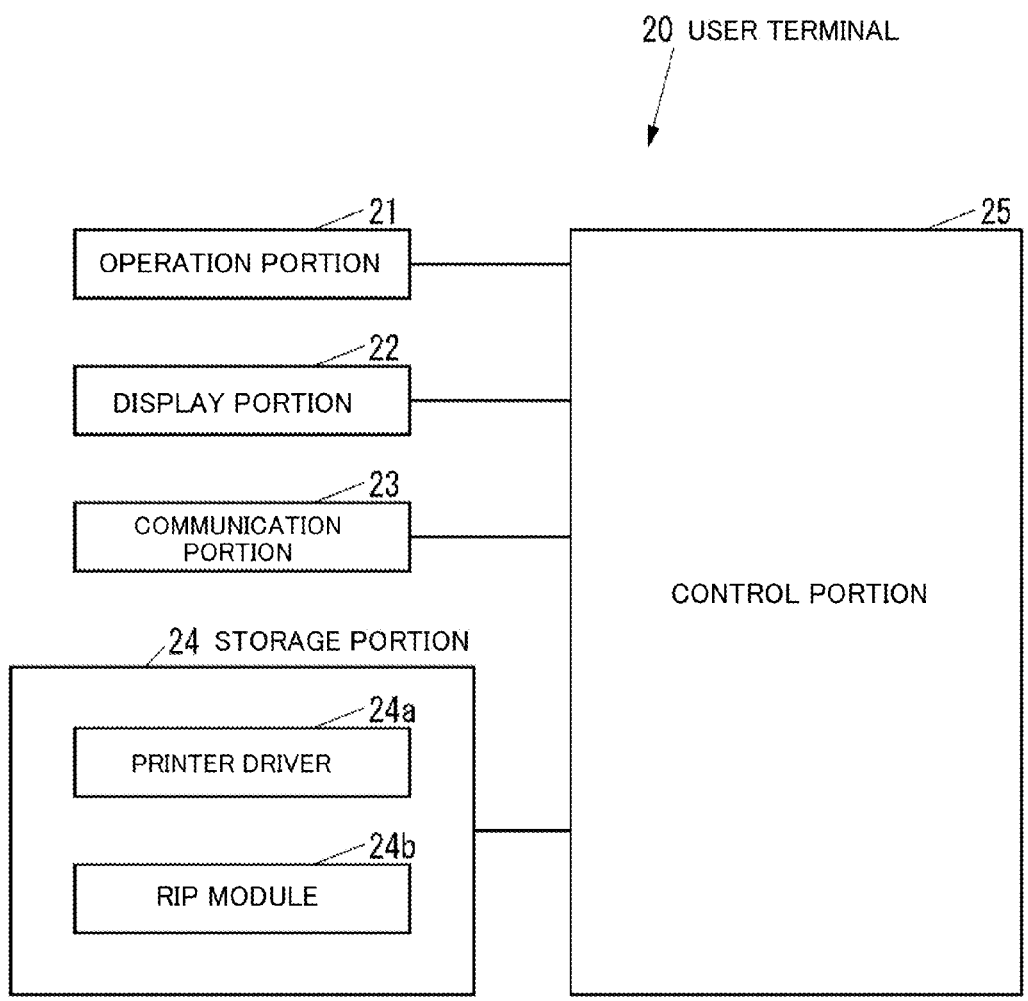
FIG. 2 is a block diagram illustrating a user terminal illustrated in FIG. 1.

FIG. 2 is a block diagram illustrating the user terminal 20.

As illustrated in FIG. 2, the user terminal 20 includes: an operation portion 21 which is an input device through which a user is allowed to perform various operation inputs; a display portion 22 which is a display device such as a liquid crystal display (LCD) on which various kinds of information is displayed; a communication portion 23 which is a communication device for communication with an external device over the network 11 (see FIG. 1); a storage portion 24 which is a storage device such as a semiconductor memory or a hard disk drive (HDD) in which various kinds of data is stored; and a control portion 25 that controls the entirety of the user terminal 20. The user terminal 20 is implemented by a mobile terminal such as a smartphone or a computer such as a personal computer (PC).

The storage portion 24 stores therein a printer driver 24a that controls operation of a printing device and a RIP module 24b that generates raster image data by executing a raster image processor (RIP) process on the basis of print data. The printer driver 24a and the RIP module 24b may be installed into the user terminal 20 at a stage of manufacturing of the user terminal 20, may be additionally installed from an external storage medium such as a universal serial bus (USB) memory into the user terminal 20, or may be additionally installed from the network 11 into the user terminal 20.

The control portion 25 includes, for example, a central processing unit (CPU), a read only memory (ROM) in which programs and various kinds of data are stored, and a random access memory (RAM) used as a work area of the CPU. The CPU executes the program stored in the ROM or the storage portion 24.

Figure 3:
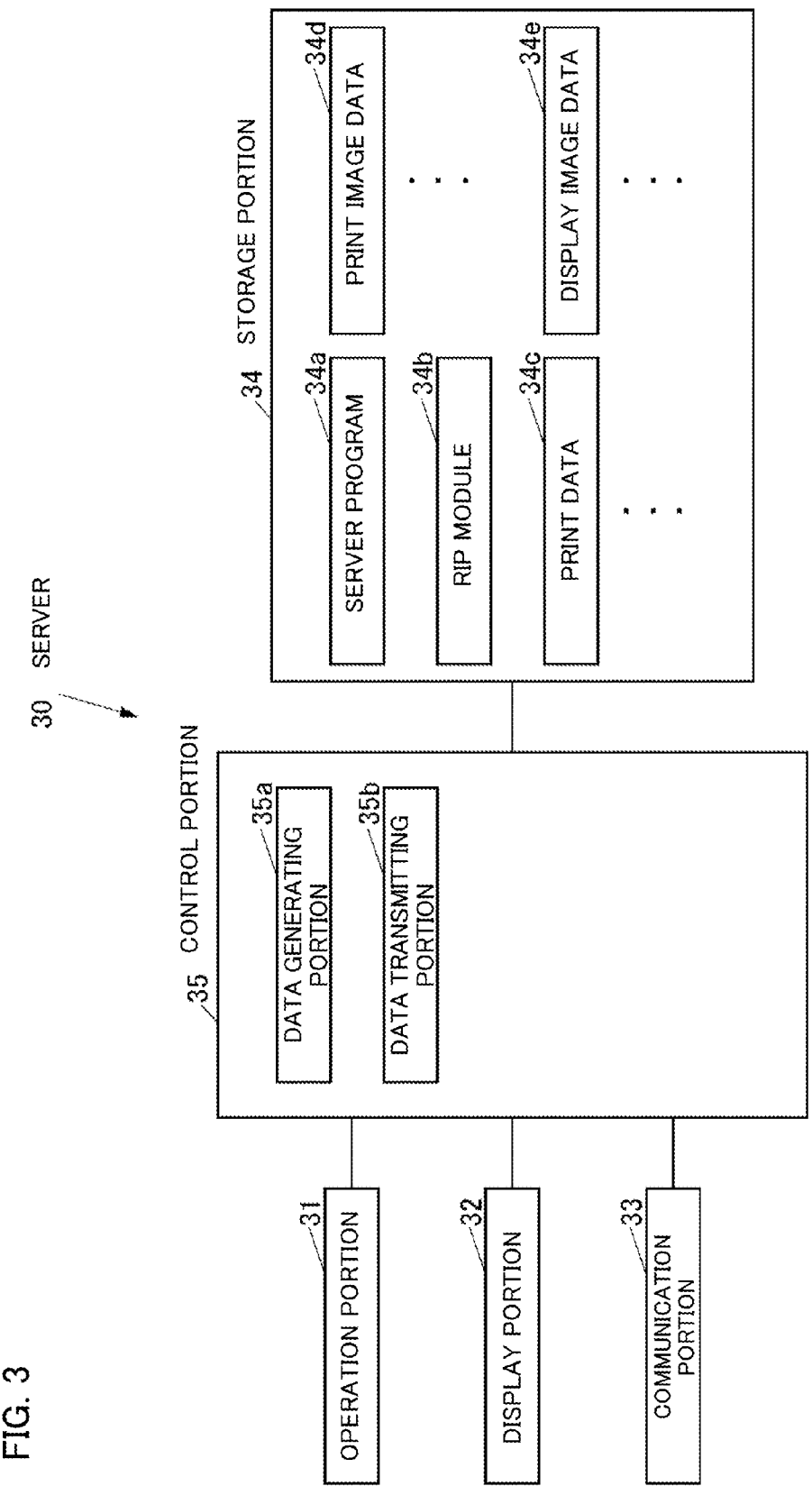
FIG. 3 is a block diagram illustrating a server illustrated in FIG. 1.

FIG. 3 is a block diagram illustrating the server 30.

As illustrated in FIG. 3, the server 30 includes: an operation portion 31 which is an input device such as a mouse or a keyboard through which a user is allowed to perform various operation inputs; a display portion 32 which is a display device such as an LCD on which various kinds of information is displayed; a communication portion 33 which is a communication device for communication with an external device over the network 11 (see FIG. 1); a storage portion 34 which is a storage device such as a semiconductor memory or an HDD in which various kinds of data is stored; and a control portion 35 that controls the entirety of the server 30. The server 30 is implemented by a computer such as a PC.

The storage portion 34 stores therein a server program 34a for controlling operation of the server 30 and a RIP module 34b that generates raster image data by executing a RIP process on the basis of print data. The server program 34a and the RIP module 34b may be installed into the server 30 at a stage of manufacturing of the server 30, may be additionally installed from an external storage medium such as a USB memory into the server 30, or may be additionally installed from the network 11 into the server 30.

The storage portion 34 can store a plurality of sets of print data 34c therein.

The storage portion 34 can store therein a plurality of sets of print image data 34d which is raster image data for printing. The print image data 34d is a file, such as a printer command language mobile (PCLm) file, a printer working group (PWG) raster file, or a universal raster format (URF) file, which can be printed by a printing device without execution of a RIP process. The storage portion 34 stores therein the sets of print image data 34d in association with the corresponding sets of print data 34c, respectively.

The storage portion 34 can store therein a plurality of sets of display image data 34e which is raster image data for display. The display image data 34e is a file, such as a portable network graphics (PNG) file, which can be previewed on a PC or a printing device. The display image data 34e includes: original data that is original image data generated by execution of a RIP process by the RIP module 34b on the basis of the print data 34c; and thumbnail data that is data of a thumbnail having a reduced data size obtained by reducing an image size of the original image. The storage portion 34 stores therein the sets of display image data 34e in association with the corresponding sets of print data 34c, respectively. In a case where the print image data 34d is used as the original data, the display image data 34e may merely include the thumbnail data among the original data and the thumbnail data.

The control portion 35 includes, for example, a CPU, a ROM in which programs and various kinds of data are stored, and a RAM used as a work area of the CPU. The CPU executes the program stored in the ROM or the storage portion 34.

The control portion 35 functions as a data generating portion 35a that generates data and as a data transmitting portion 35b that transmits data by executing the server program 34a stored in the storage portion 34.

Figure 4:
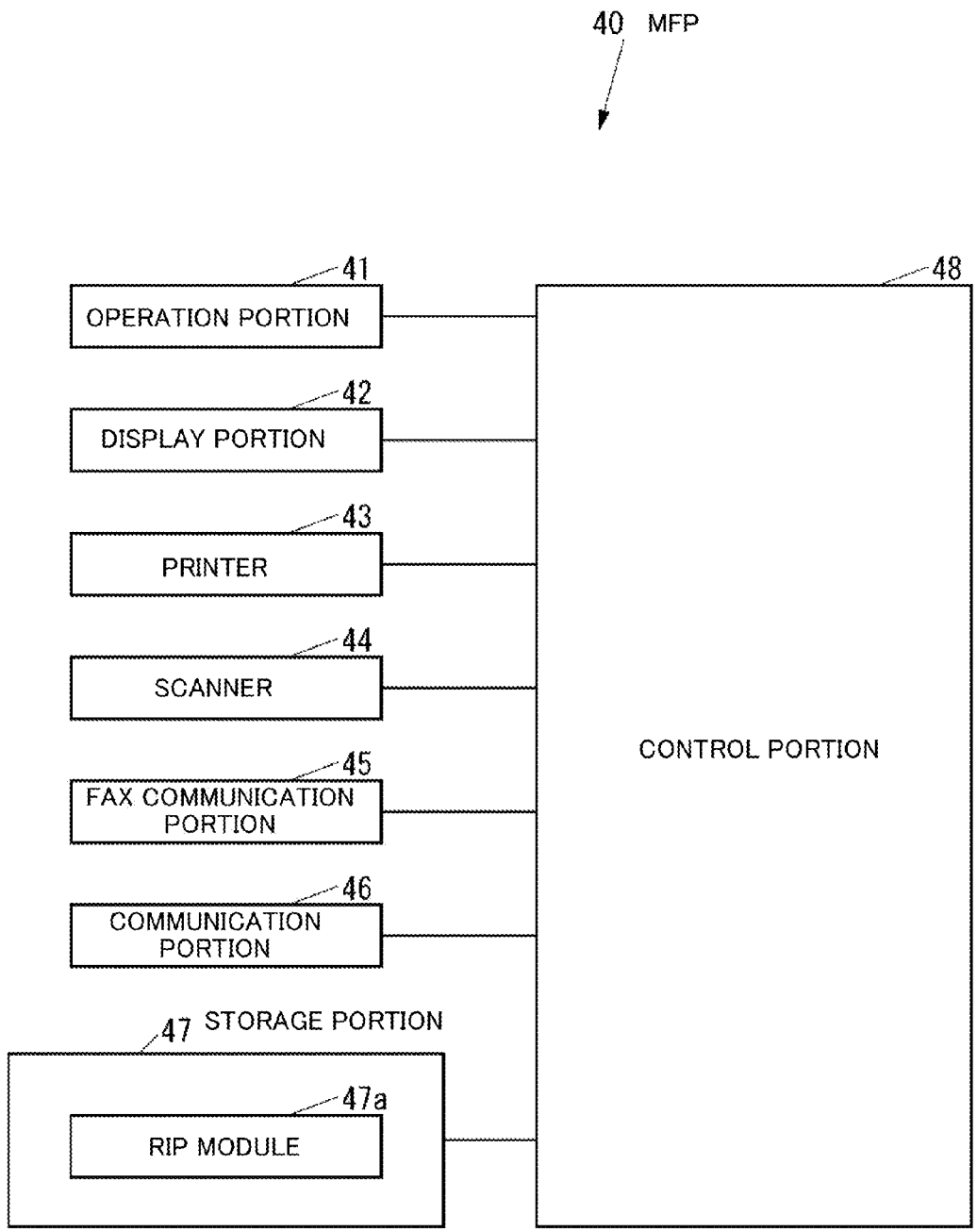
FIG. 4 is a block diagram illustrating an MFP illustrated in FIG. 1.

FIG. 4 is a block diagram illustrating the MFP 40.

As illustrated in FIG. 4, the MFP 40 includes: an operation portion 41 which is an input device such as a button through which a user is allowed to perform various operation inputs; a display portion 42 which is a display device such as an LCD on which various kinds of information is displayed, a printer 43 which is a printing device that executes printing on a recording medium such as a sheet; a scanner 44 which is a reading device that reads image data from a document; a fax communication portion 45 which is a facsimile device that performs fax communication with an external facsimile device (not illustrated) over a communication line such as a public telephone line; a communication portion 46 which is a network communication device that communicates with an external device over the network 11 (see FIG. 1); a storage portion 47 which is a storage device such as a semiconductor memory or an HDD in which various kinds of data is stored; and a control portion 48 that controls the entirety of the MFP 40.

The storage portion 47 stores therein a RIP module 47a that generates raster image data by executing a RIP process on the basis of print data. The RIP module 47a may be installed into the MFP 40 at a stage of manufacturing of the MFP 40, may be additionally installed from an external storage medium such as a USB memory into the MFP 40, or may be additionally installed from the network 11 into the MFP 40.

The control portion 48 includes, for example, a CPU, a ROM in which programs and various kinds of data are stored, and a RAM used as a work area of the CPU. The CPU executes the program stored in the ROM or the storage portion 47.

Next, operation of the image output system 10 will be described.

Firstly, operation of the user terminal 20 executed in a case where a preview display is performed on the basis of print data will be described.

A user can instruct, by using the operation portion 21 of the user terminal 20, the user terminal 20 to perform preview display on the basis of print data to be transmitted by the user terminal 20. When the instruction for preview display is issued, the control portion 25 of the user terminal 20 executes operation illustrated in FIG. 5 by executing the printer driver 24a.

Figure 5:
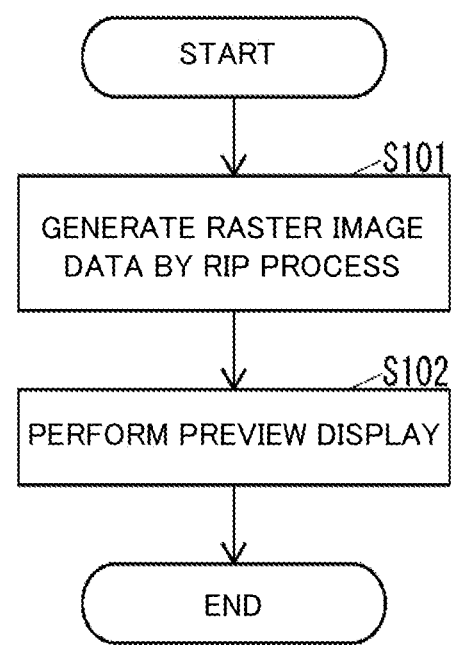
FIG. 5 is a flow chart showing operation, of the user terminal illustrated in FIG. 2, executed in a case where preview display is performed on the basis of print data.

FIG. 5 is a flow chart showing the operation of the user terminal 20 in the case of preview display being performed on the basis of print data.

As illustrated in FIG. 5, the control portion 25 of the user terminal 20 generates raster image data such as a PNG file by causing the RIP module 24b to execute a RIP process on the basis of the print data (S101), causes the display portion 22 to perform preview display on the basis of the generated raster image data (S102), and then finishes the operation illustrated in FIG. 5.

Next, operation of the user terminal 20 executed in a case where print data is transmitted will be described.

A user can instruct, by using the operation portion 21 of the user terminal 20, the user terminal 20 to transmit print data through the user terminal 20 in a case where the user decides to transmit the print data through the user terminal 20 when, for example, having checked the preview display on the display portion 22. When the instruction for transmitting the print data is issued, the control portion 25 of the user terminal 20 executes the operation illustrated in FIG. 6 by executing the printer driver 24a.

Figure 6:
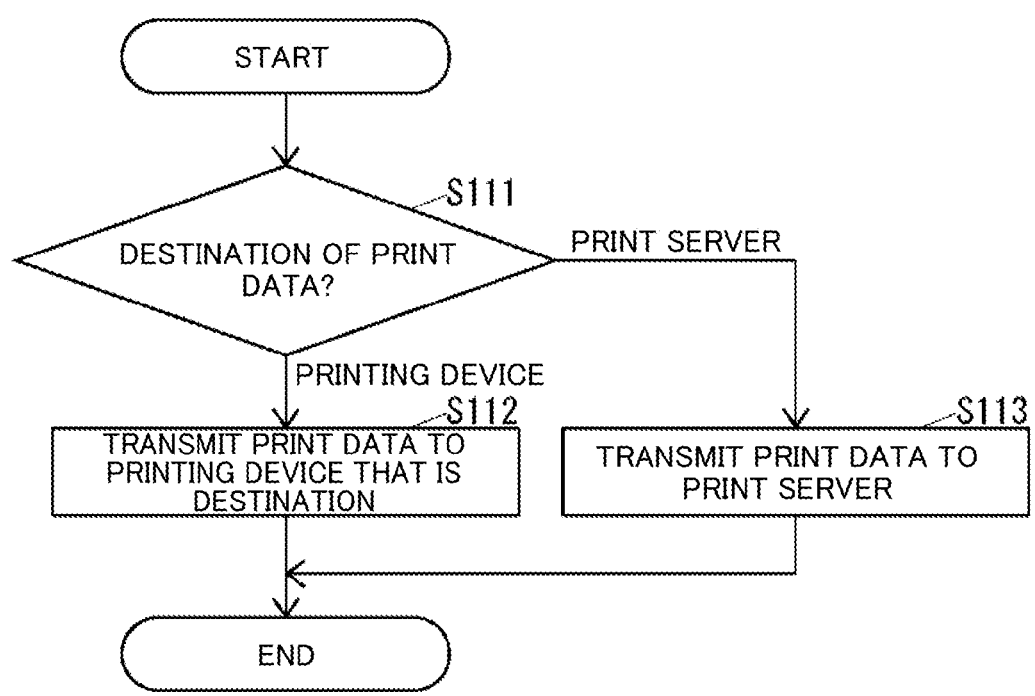
FIG. 6 is a flow chart showing operation, of the user terminal illustrated in FIG. 2, executed in a case where print data is transmitted.

FIG. 6 is a flow chart showing the operation of the user terminal 20 executed in the case where print data is transmitted.

As illustrated in FIG. 6, the control portion 25 determines a destination to which the print data is to be transmitted (S111). The user can set, in advance, the destination of the print data in the printer driver 24a by using the operation portion 21. As the destination of the print data, a specific printing device such as the MFP 40, and the server 30 can be set. Note that in a case where the server 30 is set as the destination of the print data, a destination to which data is to be transmitted from the server 30 needs to be also set. As the destination to which data is to be transmitted from the server 30, a user terminal and a printing device are determined.

In a case where it is determined in S111 that a printing device is set as the destination, the control portion 25 causes the communication portion 23 to transmit the print data to the printing device which is set as the destination (S112) and then finishes the operation illustrated in FIG. 6.

In a case where it is determined in S111 that the server 30 is set as the destination, the control portion 25 causes the communication portion 23 to transmit the print data to the server 30 (S113) and then finishes the operation illustrated in FIG. 6. In a case where the print data is transmitted to the server 30, the control portion 25 transmits "setting of the destination to which data is to be transmitted from the server 30" in addition to the print data.

Next, operation of the MFP 40 executed in a case where printing is executed on the basis of print data which is directly received from the user terminal 20 will be described.

Figure 7:
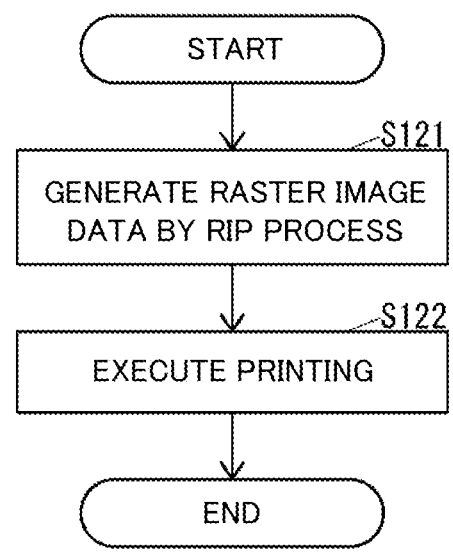
FIG. 7 is a flow chart showing operation, of the MFP illustrated in FIG. 4, executed in a case where print data is received.

When print data is received as job data from the user terminal 20, the control portion 48 of the MFP 40 executes operation illustrated in FIG. 7.

FIG. 7 is a flow chart showing operation of the MFP 40 executed in a case where print data is received.

As illustrated in FIG. 7, the control portion 48 generates raster image data such as a PCLm file, a PWG raster file, or a URF file by causing the RIP module 47a to execute a RIP process on the basis of the received print data (S121), causes the printer 43 to execute printing on the basis of the generated raster image data (S122), and then finishes the operation illustrated in FIG. 7.

Next, operation of the server 30 executed in a case where print data is received from the user terminal 20 will be described.

Figure 8:
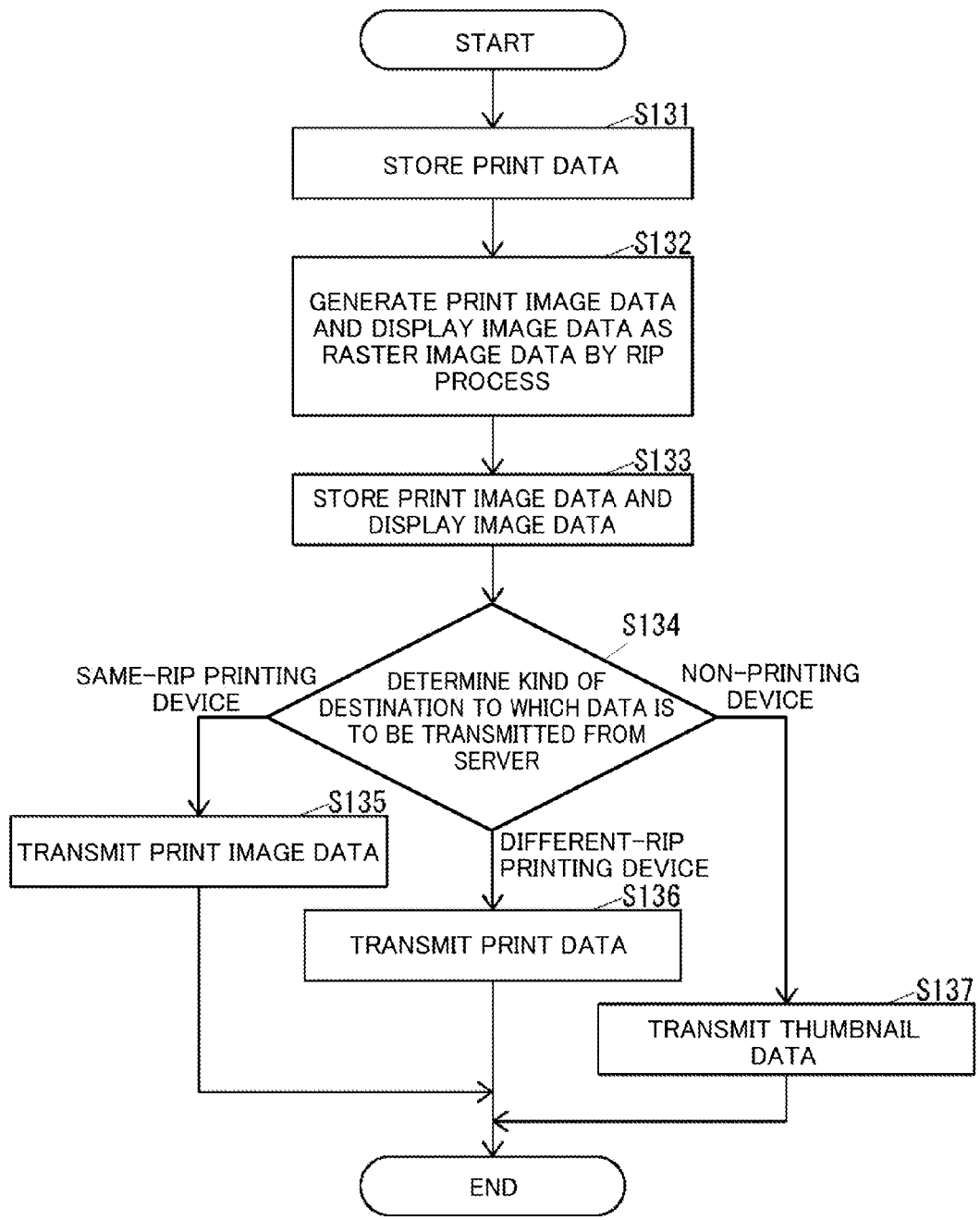
FIG. 8 is a flow chart showing operation, of the server illustrated in FIG. 3, executed in a case where print data is received from the user terminal.

When print data is received from the user terminal 20, the control portion 35 of the server 30 executes operation illustrated in FIG. 8.

FIG. 8 is a flow chart showing the operation of the server 30 executed in a case where print data is received from the user terminal 20.

As illustrated in FIG. 8, the data generating portion 35a of the control portion 35 stores the received print data in the storage portion 34 as the print data 34c (S131).

Next, the data generating portion 35a generates, as raster image data, print image data such as a PCLm file, a PWG raster file, or a URF file and display image data such as a PNG file by causing the RIP module 34b to execute a RIP process on the basis of the print data 34c stored in the storage portion 34 in S131 (S132), and then stores the generated print image data and display image data in the storage portion 34 as the print image data 34d and the display image data 34e, respectively (S133). In this case, the data generating portion 35a stores the print image data 34d and the display image data 34e in association with the print data 34c stored in S131.

Next, the data transmitting portion 35b determines a kind of the electronic device set as the destination to which data is to be transmitted from the server 30 on the basis of "setting of the destination to which data is to be transmitted from the server 30" added to the print data 34c stored in the storage portion 34 in S131 (S134). The data transmitting portion 35b determines whether the kind of the electronic device set as the destination to which data is to be transmitted from the server 30 is "a printing device (hereinafter, referred to as a "same-RIP printing device") that executes the same RIP process as performed by the server 30 on the basis of the print data", "a printing device (hereinafter, referred to as a "different-RIP printing device") that executes a RIP process different from that of the server 30 on the basis of the print data", or "an electronic device (hereinafter, referred to as a "non-printing device") that is not a printing device". The data transmitting portion 35b may determine the kind of the electronic device set as the destination to which data is to be transmitted from the server 30, on the basis of only the information of "setting of the destination to which data is to be transmitted from the server 30" added to the print data 34c or may determine the kind of the electronic device set as the destination to which data is to be transmitted from the server 30, by actually making an inquiry to the electronic device set as the destination to which data is to be transmitted from the server 30 on the basis of "setting of the destination to which data is to be transmitted from the server 30" added to the print data 34c.

In a case where it is determined in S134 that the kind of the electronic device set as the destination to which data is to be transmitted from the server 30 is a same-RIP printing device, the data transmitting portion 35b transmits the print image data 34d stored in the S133 to the electronic device set as the destination to which data is to be transmitted from the server 30 (S135) and then finishes the operation illustrated in FIG. 8.

In a case where it is determined in S134 that the kind of the electronic device set as the destination to which data is to be transmitted from the server 30 is a different-RIP printing device, the data transmitting portion 35b transmits the print data 34c stored in S131 to the electronic device set as the destination to which data is to be transmitted from the server 30 (S136) and then finishes the operation illustrated in FIG. 8.

In a case where it is determined in S134 that the kind of the electronic device set as the destination to which data is to be transmitted from the server 30 is a non-printing device, the data transmitting portion 35b transmits thumbnail data included in the display image data 34e stored in S133 to the electronic device set as the destination to which data is to be transmitted from the server 30 (S137) and then finishes the operation illustrated in FIG. 8. The non-printing device, i.e., a user terminal stores the thumbnail data transmitted in S137 in a storage portion.

Next, operation of an MFP executed in a case where print image data is received from the server 30 will be described.

Figure 9:
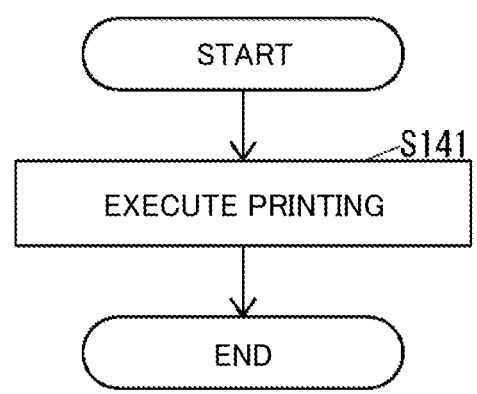
FIG. 9 is a flow chart showing operation, of the MFP illustrated in FIG. 1, executed in a case where print image data is received.

When print image data is received as job data from the server 30, the control portion of the MFP executes operation illustrated in FIG. 9.

FIG. 9 is a flow chart showing operation of the MFP executed in a case where print image data is received.

As illustrated in FIG. 9, the control portion of the MFP causes the printer of the MFP to execute printing on the basis of the received print image data (S141) and then finishes the operation illustrated in FIG. 9.

Next, operation of an MFP executed in a case where print data is received from the server 30 will be described.

When print data is received as job data from the server 30, the control portion of the MFP executes operation similar to that illustrated in FIG. 7.

Specifically, as illustrated in FIG. 7, the control portion of the MFP generates raster image data such as a PCLm file, a PWG raster file, or a URF file by causing the RIP module 47*a* to execute a RIP process on the basis of the received print data (S121), causes the printer of the MFP to execute printing on the basis of the generated raster image data (S122), and then finishes the operation illustrated in FIG. 7.

Next, operation of a user terminal executed in a case where thumbnail data is received from the server 30 will be described.

Figure 10:
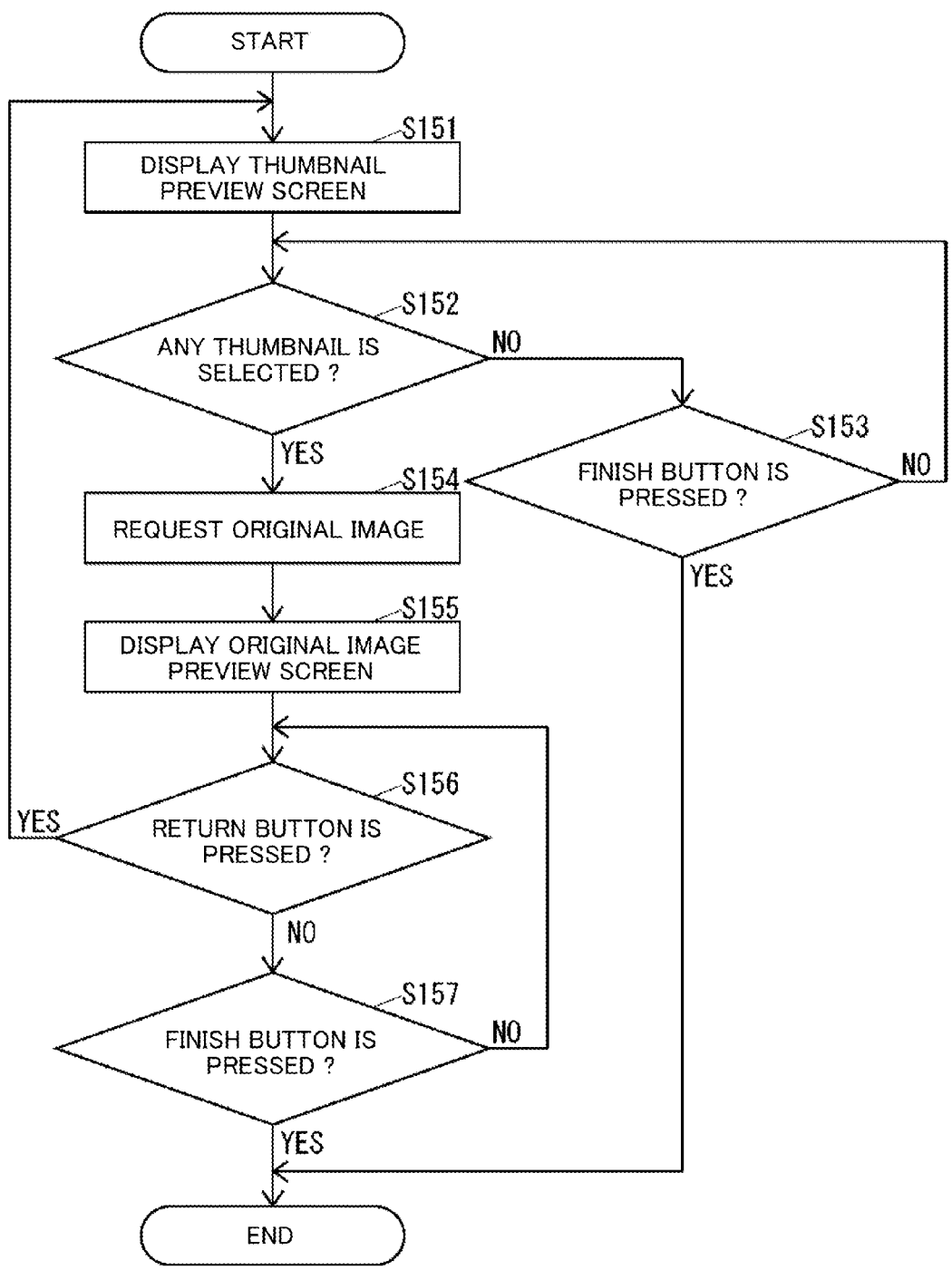
FIG. 10 is a flow chart showing operation, of the user terminal illustrated in FIG. 1, executed in a case where thumbnail data is received.

When thumbnail data is received from the server 30, the control portion of the user terminal executes operation illustrated in FIG. 10.

FIG. 10 is a flow chart showing operation of the user terminal executed in a case where thumbnail data is received.

As illustrated in FIG. 10, the control portion of the user terminal displays, on the display portion of the user terminal, a thumbnail preview screen for displaying a thumbnail based on the received thumbnail data (S151).

Figure 11:
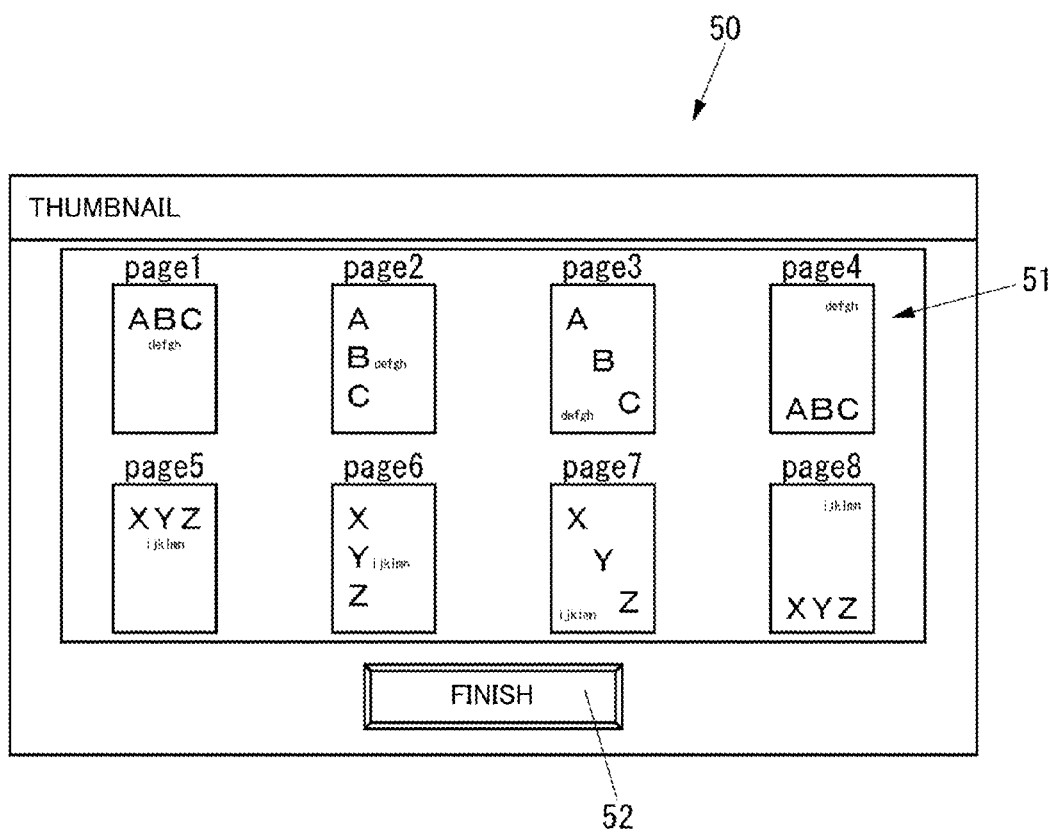
FIG. 11 illustrates an example of a thumbnail preview screen displayed in the operation illustrated in FIG. 10.

FIG. 11 illustrates an example of a thumbnail preview screen 50 displayed in S151.

The thumbnail preview screen 50 illustrated in FIG. 11 includes: a thumbnail region 51 in which thumbnails of pages of a target print job are displayed; and a finish button 52 for finishing the operation illustrated in FIG. 10.

In the thumbnail region 51, thumbnails of all pages of the target print job can be displayed. In a case where the thumbnails of all pages of the target print job cannot be displayed in the thumbnail region 51 at one time, the thumbnails can be displayed by scrolling.

A user can select any of the thumbnails displayed in the thumbnail region 51 by using the operation portion of the user terminal.

As illustrated in FIG. 10, the control portion of the user terminal determines, after the process in S151, whether or not any of the thumbnails displayed in the thumbnail region 51 has been selected (S152).

In a case where it is determined in S152 that none of the thumbnails displayed in the thumbnail region 51 is selected, the control portion of the user terminal determines whether or not the finish button 52 has been pressed (S153).

In a case where it is determined in S153 that the finish button 52 has not been pressed, the control portion of the user terminal executes the process in S152.

In a case where it is determined in S152 that any of the thumbnails displayed in the thumbnail region 51 has been selected, the control portion of the user terminal requests an original image of the selected thumbnail from the server 30 (S154).

When original data of the original image is received from the server 30, the control portion of the user terminal displays, on the display portion of the user terminal, an original image preview screen for displaying the original image based on the received original data (S155).

Figure 12:
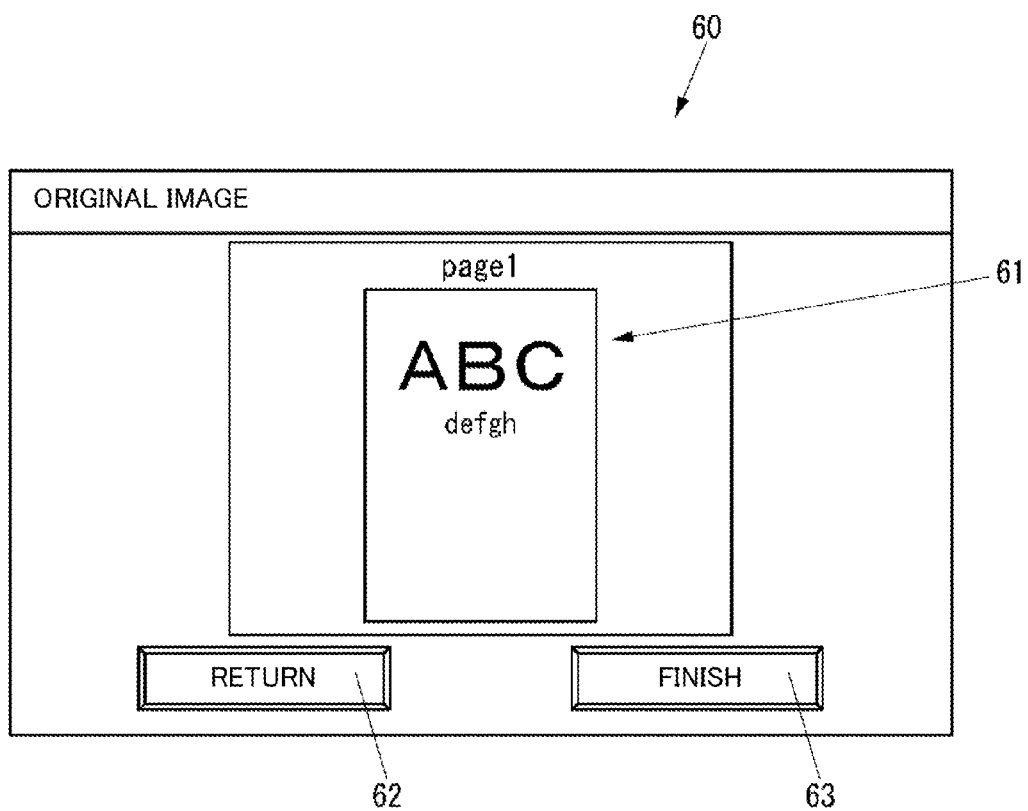
FIG. 12 illustrates an example of an original image preview screen displayed in the operation illustrated in FIG. 10.

FIG. 12 illustrates an example of an original image preview screen 60 displayed in S155.

The original image preview screen 60 illustrated in FIG. 12 includes a preview region 61 in which an original image is displayed, a return button 62 for returning to the thumbnail preview screen 50 (see FIG. 11), and a finish button 63 for finishing the operation illustrated in FIG. 10.

An image displayed in the preview region 61 can be enlarged according to an operation using the operating portion of the user terminal.

As illustrated in FIG. 10, the control portion of the user terminal determines, after the process in S155, whether or not the return button 62 has been pressed (S156).

In a case where it is determined in S156 that the return button 62 has been pressed, the control portion of the user terminal executes the process in S151.

In a case where it is determined in S156 that the return button 62 has not been pressed, the control portion of the user terminal determines whether or not the finish button 63 has been pressed (S157).

In a case where it is determined in S157 that the finish button 63 has not been pressed, the control portion of the user terminal executes the process in S156.

In a case where it is determined in S153 that the finish button 52 has been pressed or in a case where it is determined in S157 that the finish button 63 has been pressed, the control portion of the user terminal finishes the operation illustrated in FIG. 10.

In the operation illustrated in FIG. 10, an original image is acquired from the server 30 by the user terminal one page by one page. However, all pages of original images may be acquired from the server 30 by the user terminal at one time. The control portion of the user terminal causes the storage portion of the user terminal to store an original image received from the server 30. Thus, the original image can be prevented from being received from the server 30 again.

As described above, the server 30 transmits, to an electronic device, data, among the print data, the print image data, and the display image data, based on the electronic device which outputs an image, that is, based on the kind of an MFP or a user terminal (S134 to S137) and therefore can properly cooperate with the electronic device while reducing load on the electronic device.

The server 30 transmits, to an MFP, print image data as raster image data generated on the basis of print data (S135). This makes it unnecessary for the MFP to generate the raster image data on the basis of the print data (S121), thereby reducing load on the MFP. Thus, the server 30 allows the MFP to complete printing earlier. In particular, in a case where the server 30 executes the same RIP process as executed in the MFP, a printed object of the same quality as in a case where the raster image data is generated in the MFP on the basis of the print data can be obtained.

The server 30 transmits not print image data generated as raster image data on the basis of print data but the print data to an MFP that executes a RIP process different from that executed in the server 30 (S136), and therefore the MFP can obtain a high-quality printed object by generating raster image data on the basis of the print data.

The server 30 transmits not data for printing but data for display to an electronic device that is not a printing device (S137) and therefore can properly cooperate with the electronic device that is not a printing device.

Note that the server 30 may be configured so as not to transmit data to an electronic device that is not a printing device even in a case where print data is received.

The server 30 may transmit not print data but print image data to an MFP that executes a RIP process different from that executed in the server 30, as in the case of an MFP that executes the same RIP process as executed in the server 30. That is, in a case where the kind of the electronic device set as a destination to which data is to be transmitted from the server 30 is a printing device, the server 30 may transmit print image data to the electronic device. According to this configuration, the server 30 transmits print image data generated as raster image data on the basis of print data to a printing device. This makes it unnecessary for the printing device to generate the raster image data on the basis of the print data, thereby reducing load on the printing device. Thus, the server 30 allows the printing device to complete printing earlier.

The server 30 may transmit not print image data but print data to an MFP that executes the same RIP process as executed in the server 30, as in the case of an MFP that executes a RIP process different from that executed in the server 30. That is, in a case where the kind of the electronic device set as a destination to which data is to be transmitted from the server 30 is a printing device, the server 30 may transmit print data to the electronic device.

In a case where the server 30 receives print data and the kind of the electronic device set as a destination to which data is to be transmitted from the server 30 is a user terminal, the server 30 transmits thumbnail data to this user terminal. However, in a case where the server 30 receives print data and the kind of the electronic device set as a destination to which data is to be transmitted from the server 30 is a user terminal, the server 30 may transmit an original image to this user terminal.

In a case where the server 30 receives print data, the server 30 generates print image data and display image data based on the print data. However, in a case where the server 30 receives print data, the server 30 may generate only necessary one of print image data and display image data based on the print data in accordance with the kind of the electronic device set as a destination to which data is to be transmitted from the server 30.

The printing device of the present disclosure is an MFP in the present embodiment but may be a printing device other than an MFP (e.g., an apparatus dedicated to printing).

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image output system comprising:
    a terminal;
    a server; and
    a printing device, wherein the terminal, the server, and the printing device are communicable with each other via a network,
    the terminal including:
        a first storage device as at least one of a semiconductor memory and a hard disk drive (HDD) including a printer driver; and
        a first central processing unit (CPU) that executes the printer driver to transmit to the server a setting of a destination to which data is to be transmitted from the server added to print data,
    the server including:
        a second storage device as at least one of the semiconductor memory and the HDD including a program for the server; and
        a second CPU that executes the program for the server to function as:
    a data generating portion configured to:
        i) generate print image data as raster image data including one of a printer command language mobile (PCLm) file, a printer working group (PWG) raster file, and a universal raster format (URF) file, and display image data including a portable network graphics (PNG) file, by executing a raster image processor (RIP) process based on the print data received from the terminal, and
        ii) store the print image data and the display image data in the second storage device in association with the print data; and
    a data transmitting portion configured to:
        i) determine a kind of the destination to which data is to be transmitted from the server based on the setting of the destination to which data is to be transmitted from the server added to the print data,
        ii) when determining the kind of the destination is a same RIP-printing device that executes a same RIP process as performed by the server based on the print data, transmit to the destination the print image data stored in the second storage device,
        iii) when determining the kind of the destination is a different RIP-printing device that executes the RIP process differently from that of the server based on the print data, transmit to the destination the print data received from the terminal, and
        iv) when determining the kind of the destination is a non-printing device that is not the printing device, transmit thumbnail data included in the display image data stored in the second storage device.

2. The image output system according to claim 1, wherein a printer of the same RIP-printing device as the printing device executes printing based on the print image data received from the server.

3. The image output system according to claim 1, wherein a printer of the different RIP-printing device as the printing device executes printing on the basis of the print image data generated by executing the RIP process based on the print data received from the server.

4. The image output system according to claim 1, wherein,
    the first CPU of the terminal displays, on a display portion of the terminal, a thumbnail preview screen for displaying a thumbnail based on the thumbnail data received from the server.

* * * * *